July 7, 1970  H. E. CLARK ET AL  3,519,344
IMAGE PROJECTION

Original Filed Feb. 3, 1964  3 Sheets-Sheet 1

INVENTOR.
Harold E. Clark
George R. Mott
BY
ATTORNEY

July 7, 1970　　　H. E. CLARK ET AL　　　3,519,344
IMAGE PROJECTION

Original Filed Feb. 3, 1964　　　　　　3 Sheets-Sheet 3

INVENTOR.
Harold E. Clark
George R. Mott
BY
ATTORNEY

United States Patent Office 3,519,344
Patented July 7, 1970

3,519,344
IMAGE PROJECTION
Harold E. Clark, Penfield, and George R. Mott, Rochester, N.Y., assignors to Xerox Corporation, Rochester, N.Y., a corporation of New York
Continuation of application Ser. No. 343,183, Feb. 3, 1964, which is a continuation of application Ser. No. 738,520, May 28, 1958. This application Feb. 27, 1967, Ser. No. 619,072
Int. Cl. G03g 15/00
U.S. Cl. 355—5                                    11 Claims

ABSTRACT OF THE DISCLOSURE

A projection or display system wherein electromagnetic radiation is directed at a light scattering, particulate image on a specularly reflective member, the radiation impinging on the image being largely scattered and absorbed and the radiation impinging on the reflective member being reflected from the member and imaged at a radiation image receiving surface to produce an image in the pattern of said particulate image.

CROSS REFERENCE TO RELATED APPLICATIONS

This application is a continuing application of our application Ser. No. 343,183 filed Feb. 3, 1964, now abandoned, which in turn is a continuing application of our application Ser. No. 738,520 filed May 28, 1958, now abandoned.

This invention deals in general with projection optics and is particularly applied to the art of xerography.

In the art of xerography as generally practiced today, an image of electrostatic charges is formed on a plate surface. The plate member which is in greatest usage today comprises an amorphous selenium layer overlying a backing member and the charge pattern formed resides on the selenium surface whereat it is generally developed with fine electrostatically charged particles which deposit in image configuration on the surface of the plate member because of electrostatic fields of force between the particles and the charge pattern. In order to further utilize the developed image the common practice today in xerography is to transfer the image to a transfer member such as a sheet of paper or the like, whereon it is generally fixed and then viewed, stored or otherwise utilized. To date, except for particular applications, viewing of the image on the plate surface has not been common practice. One reason for this is that both the plate and the developer material are quite dark in color and attempts to examine the developed image while still on the plate result in difficulties in seeing detail and the like. Accordingly, the transfer step has generally been carried out in order to maintain image quality and allow proper examination of image information as well as for other reasons and applications of the image. Because transfer has generally been considered important in order to properly exhibit the developed image, this has necessitated transfer operation in equipment developed in this art.

Now in accordance with the present invention, novel techniques of image examination and projection are disclosed, and in accordance with these techniques examination or projection of the developed image while on the surface of the plate is effectively accomplished. Because of this invention and because all detail and information of the developed image while on the plate is made available, there results greater flexibility in the xerographic process and the transfer step may optionally be omitted. Further, since the image may now be examined or projected while on the plate, there is quicker access to the image information than has heretofore been possible. This is particularly valuable for display applications. Further and in accordance with the instant invention the brightness and contrast of the developed image can be increased substantially if desired. This factor in effect increases substantially the speed of the xerographic plate member and makes useful previously considered marginal or useless developed images. It also makes the invention particularly useful as a system for producing enhanced contrast projection images.

Accordingly, it is an object of this invention to devise novel means and methods of viewing and projecting images.

It is a further object of this invention to devise a novel system for producing enhanced contrast projection images.

It is a further object of this invention to devise novel apparatus to enhance contrast and increase effective plate speed in the art of xerography.

It is a still further object of this invention to devise novel methods to enhance contrast and increase effective plate speed in the art of xerography.

It is yet a still further object of this invention to improve upon the art of xerography in such a manner as to result in greater flexibility in the xerographic process, greater simplification in xerographic machines and to increase the applications of the art of xerography through the application of novel means and methods in accordance with the instant invention.

For better understanding of the invention, as well as other objects, and further features thereof, reference is had to the following detailed description thereof to be read in conjunction with the accompanying drawing, wherein.

Figure 1:
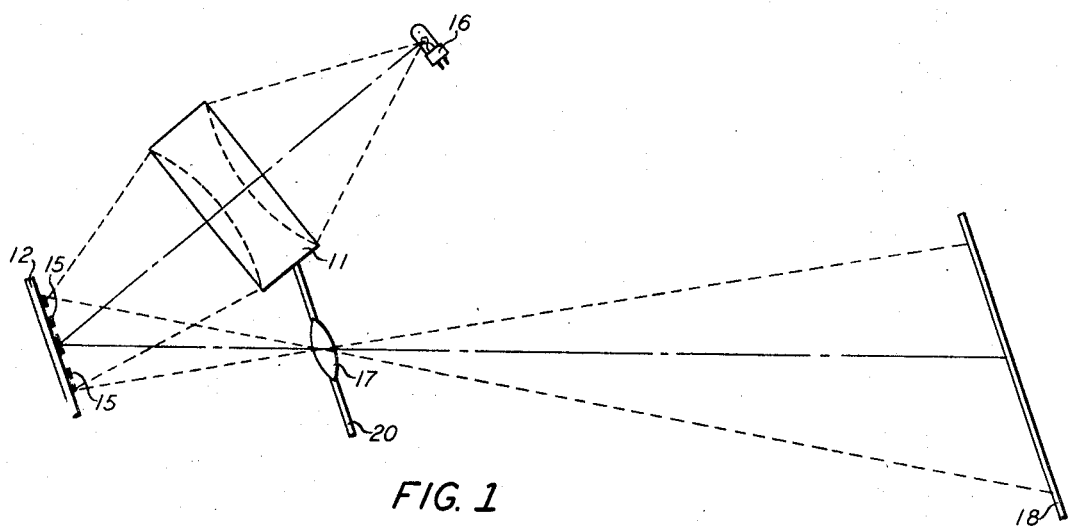
FIG. 1 is a schematic showing of an embodiment of apparatus in accordance with this invention.

For a better understanding of this invention, reference is now had to FIG. 1 wherein is illustrated a projection system in accordance with this invention. An image bearing member 12 carries on its surface image 15. Light rays from light source 16 are fed through condenser 11 and to image bearing layer 12. The surface of image bearing layer 12 is characterized as having the qualities of specularity. Thus, and for example, it may comprise vitreous or amorphous selenium or it may comprise other photo-conductive insulating layers having specular reflecting surface as, for example, a specular reflecting coating of a zinc oxide pigmented resin binder or the like, or it may comprise an overcoated photo-conductive insulating layer in which the overcoating comprises the specular reflecting surface in which case the composition of the photoconductive insulating layer is not in and of itself an essential element to bring about projection in accordance with this invention. The overcoating may comprise, for example, an opaque resin such as a dye impregnated polyvinyl acetal. Image bearing layer 12 may also comprise a transparent material overlying a specular reflecting surface as, for example, a transparent layer of anthracene overlying a tin oxide mirror-like layer. It is to be realized that the examples set forth all may be employed in the art of xerography as the xerographic plate and that such examples have been included herein because of the particular value of this invention to the art of xerography.

It is to be realized, however, that other specular image bearing surfaces exist and are well known to those skilled in the art and it is intended to include them within the scope of this invention.

The surface of image bearing layer 12 is also characterized as being mirror-like and of sufficiently high optical quality as to enable it to reflect with substantially no distortion. In particular, the surface should be free of waviness, ripples or other surface imperfections and irregularities which would direct desirable specular reflected light originating at the condensing system away from the lens.

The image material on the surface of layer 12 is characterized by its light scattering properties and the light radiation collected by lens 17 substantially only includes light reflection from the surface in uncovered areas. To further assure that light scattered by image 15 does not reach image receiving surface 18, lens 17 is mounted in lens holder 20. Lens 17 is positioned at the proper distance from image bearing layer 12 to focus the image bearing surface of layer 12 onto image receiving surface 18 and at the same time light source 16, condenser 11 and the image bearing surface of layer 12 are positioned to focus light source 16 at lens 17.

For efficient utilization of light source 16, and hence for projected images of maximum brilliance, lens 17 should have an entrance pupil at least as large as the focused image of light source 17 so that all light specularly reflected off layer 12 may pass through the entrance pupil and be utilized for projection. A larger lens 17 with a correspondingly larger entrance pupil may be employed without loss of optical efficiency, but the cost of the lens will be substantially increased without any corresponding benefit.

In accordance with the laws governing the specular reflection of light in which the angle of reflection is equal to the angle of incidence, light source 16 and the condenser 11 are so positioned to reflect light from the surface of image bearing surface 12 into lens 17 to project onto image receiving surface 18.

Image 15 may comprise any irregular light scattering material. Thus, it may comprise powder particles whether opaque or transparent which are characterized by being non-specular and not film-like. In particular, and as a further example, all particulate xerographic developers now known work well as image 15 in accordance with this invention. Such developers are available from Xerox Corporation, Rochester, N.Y. and are described in U.S. Patents 2,618,552, 2,815,330, 2,791,949 and the like.

Image receiving surface 18 may comprise a diffuse opaque reflecting surface such as a sheet of paper or a solid member covered with white paint, aluminum paint or a layer of glass beads or it may comprise a conventional projection screen or it may comprise a translucent diffusing surface such as ground glass or tracing paper in which case the projected image may be viewed from either side of the screen.

Figure 2:
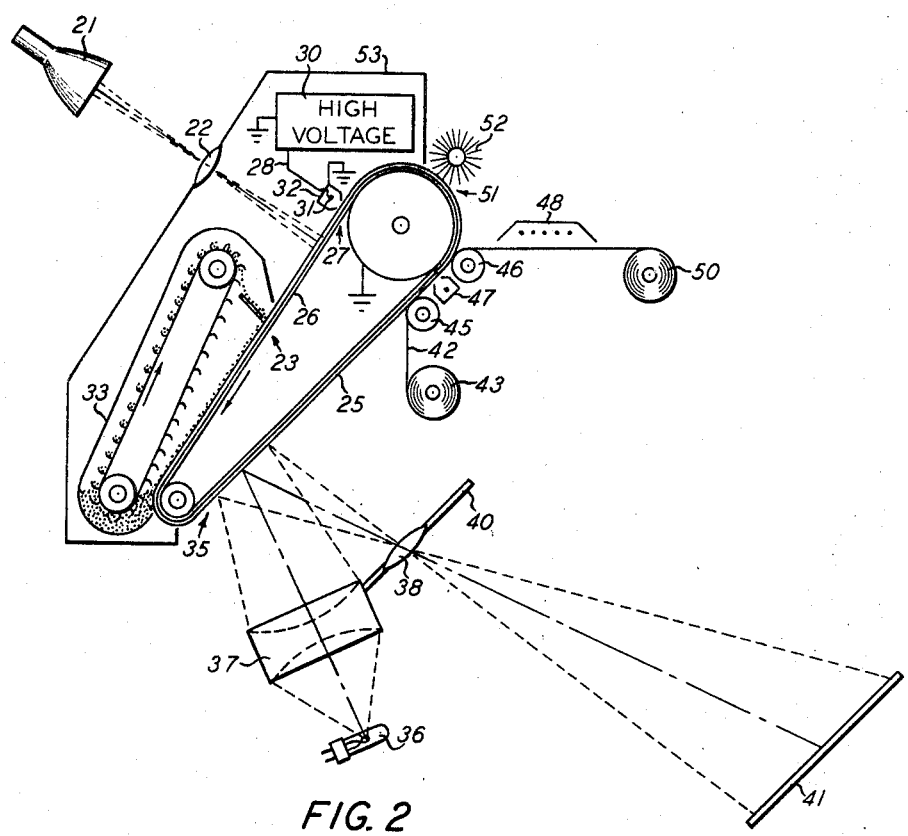
FIG. 2 is a schematic illustration of one embodiment of a device for continuous projection of images in accordance with this invention.

Reference is now had to FIG. 2 wherein is shown a continuous projection system in which an image formed on the surface of cathode ray tube 21 is projected through lens 22 to the surface of xerographic plate 23 comprising a photoconductive insulating layer 25 overlying a conductive backing member 26. In this embodiment a flexible xerographic plate is illustrated, but it is to be realized that rigid plate structures may also be used. The surface of xerographic plate 23 is charged or sensitized by charging electrode 27 connected through lead 28 to high voltage source 30. High voltage source 30 applies a voltage of several thousand volts to discharge wire 31 of discharge electrode 27 and the shield 32 of electrode 27 is maintained at ground potential. There is thus created corona discharge around discharge wire 31, and there follows charge deposition on the photoconductive layer 25 of plate 23 resulting in sensitization of plate 23. The plate is then moved to the exposure position where the image on the face of cathode ray tube 21 exposes plate 23 resulting in an electrostatic latent image which may be developed in accordance with known xerographic techniques disclosed, for example, in U.S. Patents 2,618,552, 2,638,416, 2,725,304, 2,551,582, 2,832,311 and the like. In this embodiment, at development station 33, the image is developed through the deposition of powder material cascading across the plate and particles deposit in accordance with the charge pattern created at the exposure station. The developed plate is next fed to projection station 35 whereat a light source 36 is fed through condenser 37 to the surface of plate 23. The surface of plate 23 comprises a specular reflecting surface and the image material deposited at development station 33 comprises a light scattering or diffusing material, thus resulting in a reflected image reaching lens 38 in lens holder 40 which is then projected to image receiving surface 41. Plate 23 continues to a transfer station whereat transfer material 42 is fed from supply roll 43 around rollers 45 and 46 and into contact with the surface of photoconductive insulating layer 25. While in contact a transfer charge is applied to the rear surface of transfer web 42 by discharge electrode 47 which may be connected, for example, to high voltage source 30 or to a separate applying voltage source. After the developed image is transferred to web 42, web 42 moves beneath fuser 48 whereat the transferred developed image is permanently affixed to the surface of web 42. Web 42 is then fed to takeup roll 50. Optionally, web 42 may be cut into sheets and stacked if desired. Further optionally, the entire transfer station may be placed into an inoperative position or omitted if no use other than projection of the image to the image receiving surface 41 is desired. Following the transfer station, plate 23 moves to cleaning station 51 whereat a rapidly rotating brush 52 wipes the powder image from the surface of photoconductive insulating layer 25. Optionally, as is known in the art, a hood and vacuum means may be provided around cleaning brush 52 to remove the particles from the vicinity of the plate after removal from the plate by cleaning brush 52. As is illustrated, the area of the path of travel of plate 23 including sensitization of the plate and including development of the latent image is enclosed in a cabinet or housing 53. Optionally, of course, other elements of the device may also be included within housing 53.

As should be apparent from the illustration of the apparatus in this figure, movement of the plate and the exposure system as it relates to the cathode ray display should be synchronized to a sufficient extent to avoid distortion of the image formed on the surface of plate 23. This allows much flexibility. Substantially, any display can be recorded with the apparatus in this figure, but preferably the apparatus is intended for a line-at-a-time recording or projecting system and this would include single sweeps as well as output from tubes of the character presenting variety. This system is also of great value for frame-at-a-time recordation and projection with sufficient delay built into the system feeding exposure tube 21.

Figure 3:
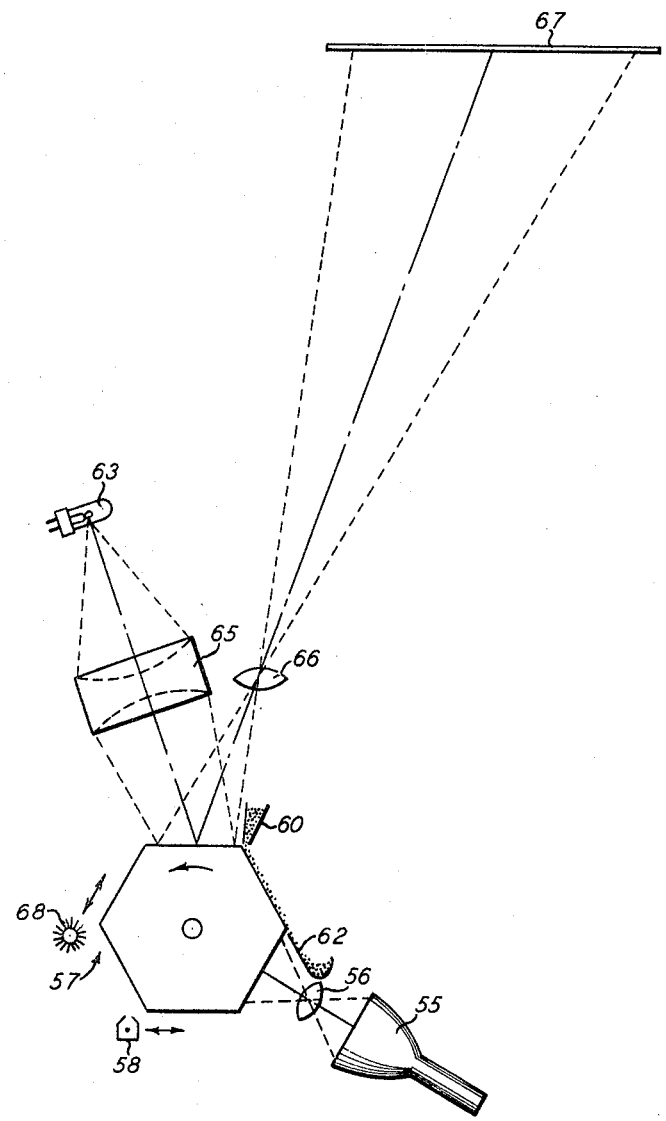
FIG. 3 is a schematic illustration of an embodiment of apparatus adapted for full frame projection in accordance with this invention.

Referring now to FIG. 3 wherein an embodiment of a full frame system is illustrated, there is shown an image source cathode ray tube 55 projected through lens 56 to the surface of a hexagonal xerographic plate 57. Plate 57 may comprise a hexagonal support member coated with a photoconductive insulating layer or it may comprise flat plates mounted on a hexagonal support member. Further and depending on the number of surfaces desired to accomplish a particular desired end purpose other polygons may be employed. Plate 57 is sensitized by charging electrode 58 which is, as is illustrated in FIG. 2, supplied with high voltage from a high voltage source to create corona discharge for deposition on the surface of plate 57 and for sensitization of the plate member. As indicated by the arrow, charging electrode 58 is mounted to move across and back over the flat surface of hexagonal plate 57 positioned in the charging position. The plate is then rotated in the direction of the arrow moving the sensitized portion of the plate 57 into the exposure position whereat a latent image conforming with the image display of information on the surface of cathode ray tube 55 is formed on the surface of plate 57. The plate is then again rotated one position and in its new position is developed by cascading developer material from a hopper 60 and across the plate surface and into storage area 62. The image on the plate is now ready for projection and it may be projected in the position shown immediately following development or it may, as illustrated, be rotated one step further into the projection zone whereat a light source 63 feeds through condenser 65 and then to the surface of plate 57 whereat because of the specular properties of the surface of plate 57, an image is projected through lens 66 and imaged on image receiving surface 67. The plate is then rotated one step further to the cleaning position, whereat cleaning brush 68 is moved in accordance with the indication of the arrow back and forth across the surface of plate 57 removing particles on the surface. Obviously, as was illustrated in FIG. 2, a transfer station may be interposed between the projection station and the cleaning station. Thus, the cleaning mechanism may be positioned at the next position of the plate and instead of the cleaning mechanism as shown a transfer station may be included in the apparatus to remove the developed image from the plate surface to a transfer web for record purposes before cleaning the plate for a new operational cycle.

In operation plate 57 stands motionless during exposure. It then is indexed quickly to the next stationary position where development takes place. In the same position it may then be projected or, as illustrated in FIG. 3, it is indexed quickly to the next stationary position whereat the developed image is projected to the image receiving surface. It is next indexed to the next position whereat the image is cleaned or optionally, if a transfer station is positioned adjacent to the apparatus, the image is transferred to a transfer web and then the drum when indexed to the next position is cleaned. The clean drum then goes through the same cycle with charging taking place to sensitize plate 57 followed by exposure, development, projection and cleaning. If the image following development is projected without rotating hexagonal plate 57 a shutter mechanism should be inserted in front of light source 63 to operate at a proper time following development to feed light to the surface of the developed plate for projection purposes.

Figure 4:
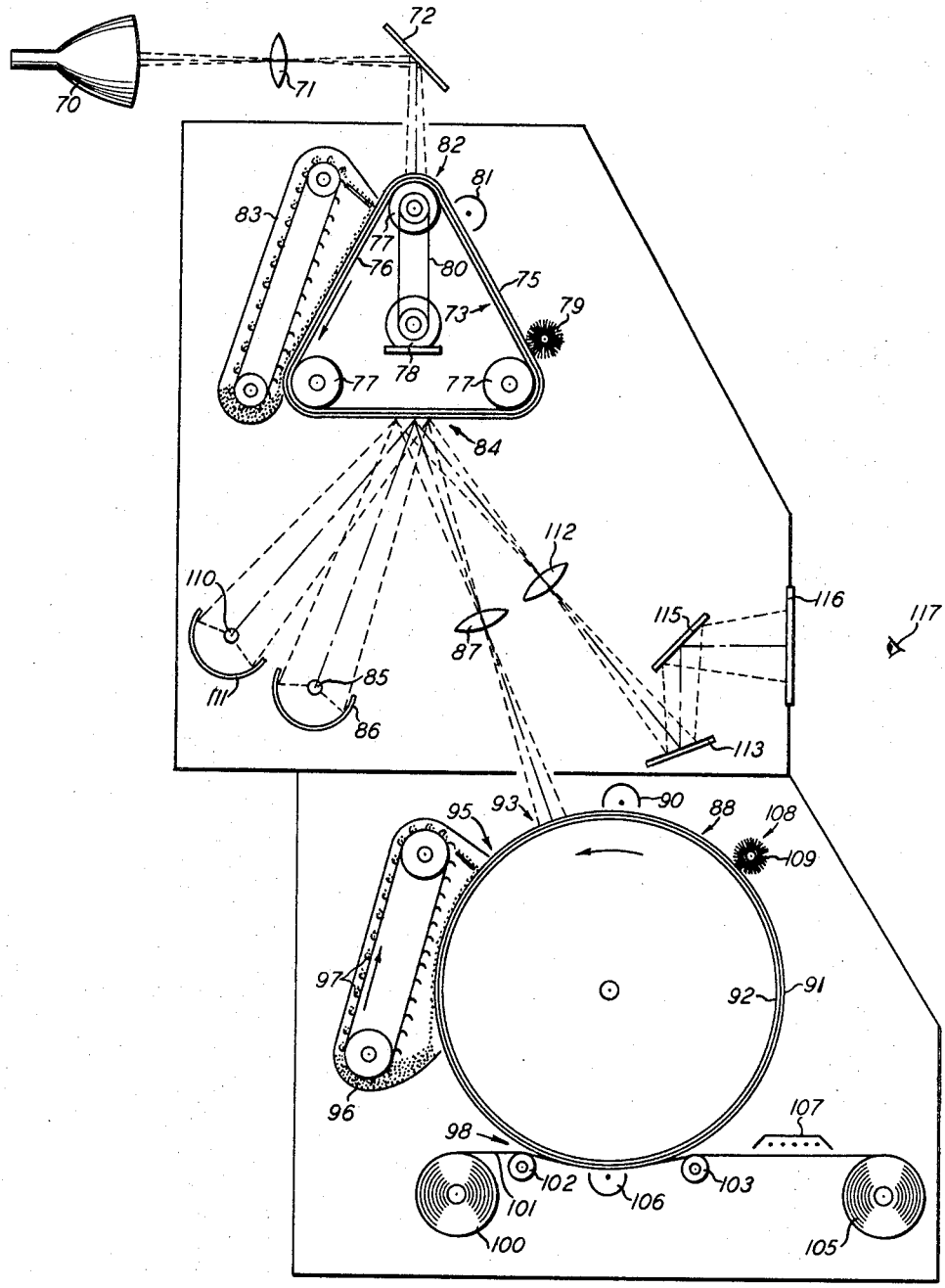
FIG. 4 is a schematic illustration of an embodiment of further apparatus in accordance with this invention.

Reference is now had to FIG. 4 wherein a cathode ray tube 70 comprises the source of the original image and its image is projected through a lens 71 to mirror 72 whereat the image is folded to the surface of a flexible continuous belt xerographic plate 73 comprising an outer layer of photoconductive insulating material 75 overlying a backing member of conductive material 76. The belt plate 73 is positioned about three rollers 77, which move the belt through its path of travel. In this embodiment the upper roller is motor driven by motor 78 connected to upper drum 77 by belt 80. The endless plate 73 is sensitized by a corona discharge electrode 81 and is then fed to the exposure zone generally designated 82 whereat the projected image of cathode ray tube 70 exposes the drum resulting in the formation of an electrostatic latent image thereon. The drum next moves through developing apparatus 83 whereat the electrostatic latent image on the surface of the drum is developed through the deposition thereon of fine powder particles in accordance with any of the aforementioned developing systems and illustrated as a cascade developing device, used in the art of xerography. The developed image is then moved into the projection zone generally designated 84 whereat a light source 85 is reflected from reflector 86 to the image bearing surface 75 of plate 73. Because of the specular reflecting qualities of plate 73 and the diffusing qualities of the developed image on its surface, there is reflected back an image projected through lens 87 and to the surface of cylindrical xerographic drum 88. This second drum may comprise, for example, a conventional xerographic continuous output machine now available from Xerox Corporation, Rochester, N.Y., under the trademark Copyflo, or an equivalent device, and would typically include a charging corona 90 connected to a high voltage source to spray charge to the surface of drum 88 comprising the photoconductive insulating layer 91 overlying a conductive backing member 92. Following passage by corona discharge electrode 90 the drum is fed to the exposure zone generally designated 93 whereat the projected reflected image from the surface of drum 73 strikes drum 88 resulting in selective dissipation of charge from the surface of drum 88 and the formation thereon of an electrostatic latent image. The drum next moves to a development zone 95, generally designated 95, in which there is positioned at the base thereof a supply of developer material 96 which is continuously picked up by hoppers 97 as hoppers 97 move in the direction indicated (driven by a motor not shown) and the developer carried by hoppers 97 is cast against the surface of drum 88 as hoppers 97 turn over during their continuous rotation at the top of their path. Particles released by hoppers 97 cascade across the surface of drum 88 and back into the reservoir of developer material 94 at the base of the developing apparatus. Next in position in the rotation of drum 88 is transfer station 98, whereat a supply spool 100 feeds transfer web 101 between roller 102 and the image bearing surface 91 of drum 88. Web 101 is positioned against the surface while between rollers 102 and 103, and it then feeds to takeup spool 105. While between rollers 102 and 103 and while in contact with the surface of photoconductive insulating layer 91, corona discharge from discharge electrode 106 is sprayed to the rear surface of web 101 and attracts to web 101 the developed image from the surface of plate 88. This image then passes between roller 103 and takeup roll 105 beneath fuser 107 whereat the image is fixed or made permanent on web 101. Various fusing techniques may be employed, such as vapor, heat, coating or the like as are commonly known in the art. Following transfer, the drum moves to cleaning station 108 whereat is illustrated a brush 109 which is positioned in contact with the surface of drum 88 and may be of the type described in Walkup et al. U.S. Pat. 2,832,977 or the like and including further the various components of that patent. A similar cleaning station 79 is positioned adjacent to plate 73 after the projection station to remove the powder image from plate 73 before plate 73 is recycled.

There is also shown in this figure an arrangement to project the image from the surface of plate belt 73 to a viewing screen while the image is being projected to drum 88 for copying purposes. To accomplish this, light source 110 is fed by reflector 111 to the image bearing surface of photoconductive insulating layer 75 at the same area as light source 85. This separate light source, light source 110, is then focused at lens 112 onto mirror 113 and then to mirror 115 to viewing screen 116. The mirrors involved here, mirrors 113 and 115, are for purposes of putting the image at a practical viewing point and for providing the viewer with a proper reading image. These elements may be modified as is well known by those skilled in the art, as, for example, through the modification of the original image being fed to the cathode ray tube 70 or the like. The particular viewing screen illustrated in this figure may comprise ground glass or the like and the image is viewed by eye 117. This feature of the appartaus need not be included at the particular point illustrated. Thus, and for example, it may be positioned prior to transmission of the reflected image to the copying drum 88 or subsequent to that area. It has, however, been included at this point to show a further benefit of this invention in that each light source is specularly reflected and each reflected pattern is dependent only on the original light source. Thus, there is no reduction in image intensity as where beam splitting or the like is employed. It is also to be understood that the viewing arrangement may optionally be placed into an inoperative position if viewing of the image being recorded is not desired. A particular value of the apparatus of FIG. 4 is that it provides a means for increasing contrast and for making permanent copy at a useful level even when the original is extremely thin in contrast or of a weak projection intensity. This is accomplished through increase in contrast obtained when the developed image is projected to drum 88 resulting in a contrasty valuable original for copying purposes.

As should be apparent, various elements of this figure may be varied and still be within the scope of the present invention. Thus, and for example, instead of an original of copy to be reproduced supplied by a cathode ray tube, microfilm or other original sources may be employed and may be projected in the same or in similar fashions. Also there is no need to use a folded optical system to endless plate 73. Further, although plate 73 is shown in the form of an endless belt it may be a drum similar to drum 88 or it may comprise individual flat plates shifted into position and moved through the exposure zone or it may comprise plates attached to a base layer for support and transport purposes or the like. Also as shown in this figure, light source 85 is projected through a reflector to the surface of plate 73. It should be apparent in considering the previous figures a condenser may be employed instead of reflector 86. The object primarily is that of the light source imaged at the lens and any means of accomplishing this objective is intended to be included herein. Similarly, and as has been discussed previously, although a transfer station 98 is illustrated in this figure, if no permanent copy of the image is desired there is no need to include a transfer station or optionally a transfer station may be included for purposes of utilization when desired, and if desired, and may otherwise be positioned in an inoperative position. Also although in this embodiment an image is recorded using xerography and drum 88 it should be realized that the xerographic portion of this apparatus may be replaced with a photographic copying system or the like. Other modifications which will occur to those skilled in the art may also be encompassed herein.

The experimental work carried out in connection with this invention has primarily concerned itself with xerographic plates including layers of amorphous selenium and the images projected from these plates have generally been enlarged for viewing purposes. On examination it has been found that the typical selenium plates available from Xerox Corporation (which are the same plates used in the experiments in connection with this invention) have a spectral reflectivity of about 25% to 35%. This reflectivity allows viewing of enlarged reproductions of the powder display on the surface of the plate comfortably in well-lighted rooms. It is quite apparent, however, that when using the instant invention to reduce an original a lower percentage of reflectivity may be used as comfortably in a well-lighted room as that of the selenium surface used for enlargement. Accordingly, it is now generally believed that when examining information projected to screens in lighted rooms that reflectivity in the order of about 15% is generally required. Above 25% reflectivity results in high quality enlargements, reproductions or 1 to 1 projections under substantially any conditions and accordingly is preferred. Further, since the selenium surface of xerographic plates is in this range, a layer of selenium as the image bearing layer is preferred. It is to be realized, however, that reflectivity levels as low as 5% are usable and valuable in connection with this invention. In such a case it is necessary to intensify the light source to create a usable projected image, or if the original is reduced during projection, or the projected image viewed in a semi-darkened or darkened room then the usual light source may be used.

As to the light source used, a particular one which has been in use successfully involves a 250-watt mercury arc lamp fed through a condenser and resulting in a 5 times magnification of the image on the image bearing surface on the screen using a 7¼ inch f 4.5 lens system and resulting in an image with an intensity of 100 foot candles on the screen. In addition to visible light, such a light source produces ultra-violet light which may also be used for projection, or a pure ultra-violet source may be used. As should be apparent, normal incandescent lamps and the like can be used to create the light desired for projection purposes, and further as is apparent to one skilled in the art, various modifications in the optics including modifications in the light source are possible to produce an image of the particular intensity desired on the image receiving surface. Thus, it might be noted that instead of a lens there may be used mirrors, prisms and the like. Further, instead of the lens being positioned in a plane parallel to the image bearing surface and image receiving surface, it may be at an askewed angle thereto and result in high quality copy and projection. However, in such an instance the depth of field would be slightly deteriorated and a keystoning effect would be present which could be compensated for in the exposure step.

It is also noted that using known xerographic developing systems one is able to develop either the light exposed areas or the unexposed areas with powder particles depending on whether a reversal or positive developing technique is employed. Thus, through this flexibility of the xerographic process, one can use either photographic positives or photographic negatives as the original copy and produce positives in all instances in the projected image for viewing purposes or in the projected image for copying purposes, if desired.

The apparatus and principles of this figure have been found extremely valuable where it is desired to increase the effective speed of the xerographic plate and to increase the contrast of an image. Thus, and for example, one application of the xerographic plate includes exposure of the plate to X-ray radiation. To date the images produced through X-ray exposure have been of exceedingly high quality. However, because of the speed of xerographic plates xeroradiography has generally been limited to nondestructive industrial testing. Using the principles illustrated in FIG. 4, the speed of the plate may effectively be increased as much as 16 times. This is explained when considering the thin developed image produced when the exposed plate is developed for if examined through conventional viewing techniques, as through examination of a transferred image to a sheet of paper or on the plate itself, the image is of inadequate density differences to convey its information. However, when this same powder on a specularly reflecting surface is projected in accordance with the techniques of this invention, then the specular reflection differential between image areas and background areas results in clear intelligible information projected to the image receiving surface. This occurs because the thin powder layers have a very low diffuse reflection density but a very high specular reflection density. Thus, the powder layers when viewed in accordance with this invention appear dense and black and the reflected specular areas of the plate appear intensely bright. Accordingly, there results an effective increase in plate speed as well as contrast enhancement when operating within the principles of this invention. Accordingly, this invention makes xerography extremely useful in the art, for example, of medical X-ray. It also increases the value of xerography in fields where one is interested in enhancing the original contrast to be produced in the end print as, for example, when dealing with extremely thin negatives. Similarly, this makes practical systems of daylight viewing of projected images from cathode ray tubes onto large screens even though the original intensity of the light source is extremely low, thus expanding the utility and efficiency of radar scope images, television images and the like.

While various embodiments of the present invention have been described and various uses of the present invention have been described, as should readily be apparent many other applications and variations exist and it is not desired to be limited only to the particular embodiments and applications described herein, but it is intended to cover the invention broadly within the spirit and scope of the appended claims.

What is claimed is:

1. A method of projecting simultaneously and independently at least two optical representations of a common portion of a light-scattering particulate image on a specularly reflective member comprising the steps of:
   (a) providing a specularly reflective member comprising a photoconductive layer overlying an electrically conductive substrate;
   (b) depositing a light-scattering, particulate image on said specularly reflective member by uniformly electrostatically charging said member, exposing said charged member to a projected optical input image to produce a latent electrostatic image and developing said latent electrostatic image with light scattering particles;
   (c) imaging each of at least two light sources at corresponding lenses through optical paths including a common portion of the specularly reflective member bearing the light-scattering, particulate image and imaging respectively the specularly reflected light from each of said light sources and from said specularly reflecting surface onto corresponding image receiving surfaces positioned at conjugate focal planes of each of said lenses, and intercepting before said image receiving surfaces substantially all light scattered by the light-scattering particulate image on said specularly reflecting surface.

2. A method according to claim 1 wherein at least one of said image receiving surfaces is a uniformly charged xerographic plate and at least one of said remaining image receiving surfaces is a viewing screen.

3. The method according to claim 1 wherein said specularly reflective member comprises a specularly reflective layer of amorphous selenium photoconductor overlying an electrically conductive substrate.

4. Apparatus for displaying optical input images comprising:
   (a) a specularly reflective layer of a photoconductor;
   (b) means to uniformly electrostatically charge said photoconductor layer;
   (c) a projector to project an optical input image onto said photoconductor layer to form a latent electrostatic image, corresponding to said optical input;
   (d) means to develop said latent electrostatic image with light-scattering particles to produce on said photoconductor layer a light-scattering particulate image corresponding to said latent electrostatic image;
   (e) an image receiving surface;
   (f) means for directing electromagnetic radiation at the particulate image bearing specularly reflective member, portions of said radiation impinging on the particulate image areas being largely scattered and absorbed, and portions of said radiation impinging on the specularly reflective member being largely reflected therefrom; and,
   (g) means to image the surface of said specularly reflecting layer at said image receiving surface, and to largely reject light scattered by said particulate image.

5. Apparatus according to claim 4 wherein said means for directing electromagnetic radiation includes means for directing an obliquely incident beam of light at the particulate image bearing specularly reflective photoconductor layer and wherein said means for directing electromagnetic radiation and said means to image include means for imaging a light source at a lens, through an optical path including the specularly reflected light from said specularly reflecting layer, said lens being positioned with respect to said image receiving surface and said specularly reflecting layer to image the surface of said specularly reflecting layer at said image receiving surface, and to largely reject light scattered by said particulate image.

6. Apparatus according to claim 5 wherein said photoconductor comprises amorphous selenium.

7. Apparatus for displaying optical input images comprising:
   (a) a specularly reflective, electrically insulating layer over a photoconductor overlying an electrically conductive substrate;
   (b) means to uniformly electrostatically charge said electrically insulating layer;
   (c) a projector to project an optical input image onto said photoconductor layer to form a latent electrostatic image, corresponding to said optical input;
   (d) means to develop said latent electrostatic image with light-scattering particles to produce on said electrically insulating layer a light-scattering particulate image corresponding to said latent electrostatic image;
   (e) an image receiving surface; and,
   (f) means for imaging a light source at a lens, through an optical path including the specularly reflected light from said specularly reflecting layer, said lens being positioned with respect to said image receiving surface and said specularly reflecting layer to image the surface of said specularly reflecting layer at said image receiving surface, and to reject light scattered by said particulate image.

8. Apparatus for displaying optical input images comprising:
   (a) a layer of a photoconductor substantially transparent to the electromagnetic radiation from the light source of (f), overlying a specularly reflective, electrically conductive substrate;
   (b) means to uniformly electrostatically charge said transparent photoconductor layer;
   (c) a projector to project an optical input image onto said transparent photoconductor layer to form a latent electrostatic image, corresponding to said optical input;
   (d) means to develop said latent electrostatic image with light-scattering particles to produce on said transparent photoconductor layer a light-scattering particulate image corresponding to said latent electrostatic image;
   (e) an image receiving surface; and,
   (f) means for imaging a light source at a lens, through an optical path including the specularly reflected light from said specularly reflecting layer, said lens being positioned with respect to said image receiving surface and said specularly reflecting layer to image the surface of said specularly reflecting layer at said image receiving surface, and to reject light scattered by said particulate image.

9. Apparatus for displaying optical input images comprising:
   (a) a rigid xerographic plate having the form of a polygon and rotatable about its axis comprising a specularly reflective photoconductor layer overlying an electrically conductive substrate;
   (b) means to uniformly electrostatically charge a face of said plate while in a first face location;
   (c) a projector to project an optical input image onto a charged face of said plate to thereby form a latent electrostatic image thereon;
   (d) means to rotate said xerographic plate about its axis, following formation of the latent image, to advance the latent image bearing face to a second face location;

(e) developing means adjacent said second face location to deposit electroscopic marking particles to said latent electrostatic image to form a light-scattering particulate image on the xerographic plate corresponding to said latent electrostatic image;

(f) an image receiving surface; and (g) means for imaging a light source at a lens, through an optical path including the specularly reflected light from said specularly reflecting layer, said lens being positioned with respect to said image receiving surface and said specularly reflecting layer to image the surface of said specularly reflecting layer at the image receiving surface, and to largely reject light scattered by said particle image.

10. Apparatus according to claim 9 wherein the photoconductor layer comprises amorphous selenium.

11. Apparatus according to claim 10 wherein said means for imaging a light source comprises a lamp and a condenser positioned to illuminate said light-scattering particulate image bearing specularly reflective layer with an obliquely incident beam of light and a lens means including a projection lens positioned to intercept the light from said lamp specularly reflected from said photoconductor layer said projection lens having an entrance pupil positioned and adapted to be substantially co-extensive with the image of said lamp, with the imaging receiving surface at a focal plane of said projection lens conjugate to said xerographic plate.

References Cited

UNITED STATES PATENTS

| | | |
|---|---|---|
| 1,902,907 | 3/1933 | Semenitz. |
| 2,496,272 | 2/1950 | Current. |
| 2,690,394 | 9/1954 | Carlson _____ 95—1.7 |

FOREIGN PATENTS

| | | |
|---|---|---|
| 723,534 | 2/1955 | Great Britain. |

OTHER REFERENCES

Textbook, The Optical Lantern, Pringle 1899, p. 11.

JOHN M. HORAN, Primary Examiner

U.S. Cl. X.R.

355—46